Feb. 10, 1942.  W. S. BRINK  2,272,889
WHEEL STRUCTURE
Filed April 4, 1939  2 Sheets-Sheet 1
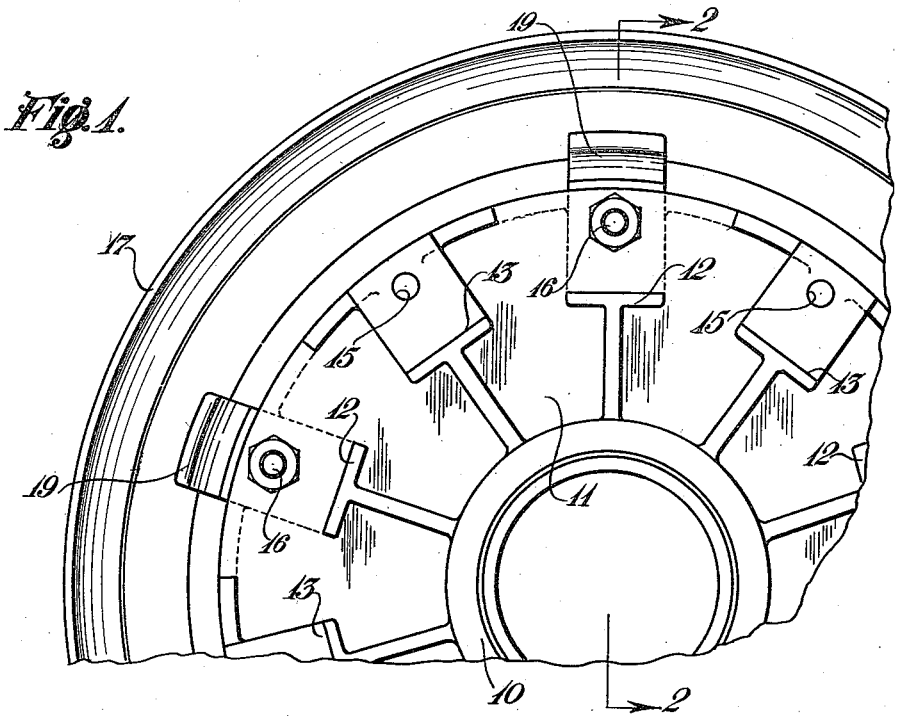
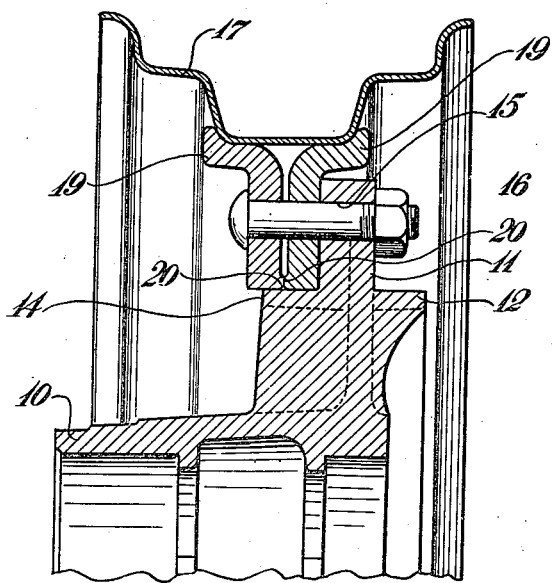
INVENTOR
Winfield S. Brink
BY
Ely & Frye
ATTORNEYS Feb. 10, 1942.  W. S. BRINK  2,272,889
WHEEL STRUCTURE
Filed April 4, 1939   2 Sheets-Sheet 2

INVENTOR
Winfield S. Brink
BY Ely & Frye
ATTORNEYS

Patented Feb. 10, 1942

2,272,889

UNITED STATES PATENT OFFICE 2,272,889

WHEEL STRUCTURE

Winfield S. Brink, Akron, Ohio, assignor to The Firestone Tire & Rubber Company, Akron, Ohio, a corporation of Ohio Application April 4, 1939, Serial No. 265,893

8 Claims. (Cl. 301—24)

This invention relates to wheel structures, and more especially it relates to wheel structures of the type used on agricultural vehicles wherein adjustment of the tire rim laterally of the center line of the vehicle is resorted to as a means of altering the tread width of the vehicle.

The invention is of especial utility for use with wheel structures that employ clamps for securing the rim thereon, said invention comprising an improved type of clamp. Preferably the invention comprises a wheel structure wherein the tread center is disposed to one side of a transverse plane passing through the center of the hub so that reversal of the position of the hub upon the axle alters the position of tread center of the wheel with relation to the center line of the vehicle.

The chief objects of the invention are to provide a wheel structure of the character mentioned having rim-supporting seats at various positions axially with relation to the hub thereof; and to provide improved rim clamps for securing a rim to the wheel. More specifically the invention provides rim clamps that will not deform the rim to out of round condition or flex it into eccentricity with relation to the axis of the wheel; that will not flex the rim out of its normal plane; and which may be utilized to position the rim in alternative positions with relation to the central plane of the wheel. Other objects will be manifest as the description proceeds.

Of the accompanying drawings:

Figure 1 is a fragmentary side elevation of a wheel structure constituting one embodiment of the invention;

Figure 2 is a section on the line 2—2 of Figure 1;

Figure 3:
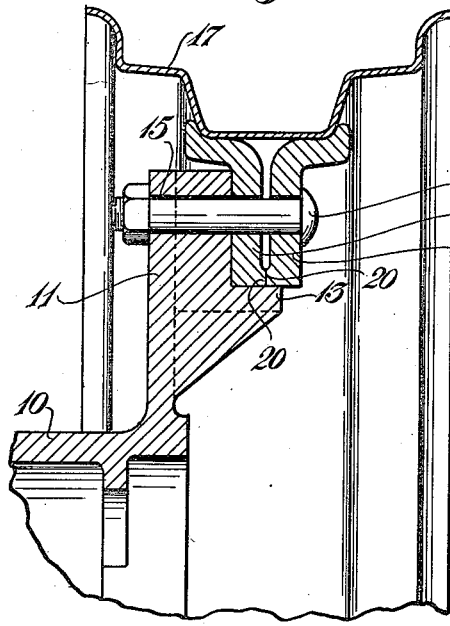
Figure 3 is a section similar to Figure 2 showing the rim mounted in an alternative position upon the wheel.
Figure 4:
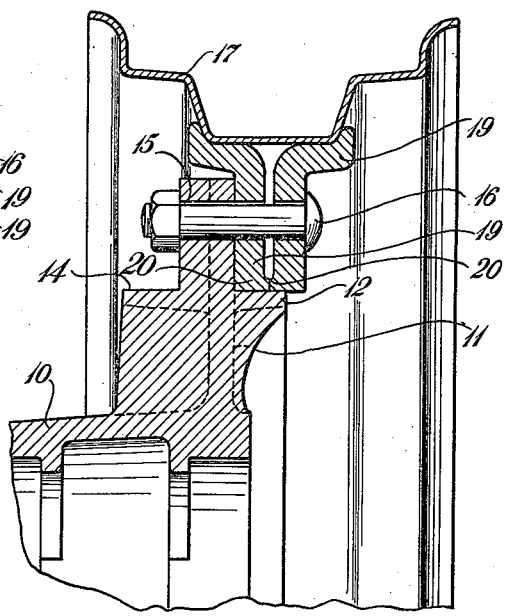
Figure 4 is a section similar to Figure 3 showing the rim mounted in another alternative position upon the wheel.

Referring to the drawings, there is shown a cast metal wheel structure comprising a hub 10 and an integral disc 11, the latter being located adjacent one end of the hub. The hub is so constructed as to be reversible upon its axle, with the result that the disc 11 is thereby capable of being disposed at alternative positions with relation to the center line of the vehicle. The disc 11 is formed on opposite sides with respective series of seats, which include radially extending surfaces, for supporting the clamps that attach the rim to the wheel disc. On one side of the disc at least there are two series of such seats, the seats of one series being disposed between the seats of the other series, one of said series being disposed laterally of the other series in the direction of the axis of the wheel. Figure 1 shows a side of the wheel provided with two series of clamp seats, the seats of one series being designated 12, 12, and the seats of the other series being designated 13, 13, there being five seats in each series. The seats 12, 13 are disposed the same distance radially outwardly of the axis of the wheel, but the seats 13 are disposed laterally at a distance from the lateral face of disc 11 whereas the seats 12 abut said face, as readily will be apparent from a comparison of Figure 3 with Figure 4. The opposite side of the disc 11 as shown is formed with a single circumferential series of rim clamp seats 14, 14, which seats are disposed back-to-back with relation to the seats 12 on the other side of the disc, as is clearly shown in Figure 2 and Figure 4. The seats 14 are shown as being positioned at a short distance from the lateral face of the disc, but this distance is optional and the seats may abut the lateral face of the disc if desired. It will be obvious that another series of seats might be positioned beside the seats 14, similar to the arrangement of seats 12, 13 on the opposite side of the disc, if desired. Bolt holes 15 are formed in the disc 11 radially outwardly of the seats 12, 13, said holes also serving the seats 14 on the opposite side of the disc. The bolt holes 15 accommodate the bolts 16 that tighten and retain the clamps that support a tire rim 17 upon the wheel.

The rim 17 as shown is a drop center type rim having the usual central circumferential well or channel therein. Each of the clamps that engage the rim 17 comprises two substantially identical elements 19, 19, which elements are angular metal plates disposed in confronting relation to each other. The outer end portions of the clamp plates 19 are reversely curved, the curvature of one plate being away from the curvature of the other plate, whereby said curved portions of the plates are enabled to engage the opposite margins of inner circumferential portion of the central well of the rim. The confronting faces of the elements 19, at the inner end thereof, are formed with respective transverse ribs or projections 20, 20 that abut each other in the assembled wheel structure, said ribs constituting fulcrums about which the clamp elements turn to cause the angular outer end portions of the clamp elements to grip the rim, the clamp elements otherwise being spaced apart from each other. The seats 12, 13, and 14 are of such width that a pair of clamp elements 19 may rest with their inner ends thereupon, said clamp elements being formed with respective apertures that are aligned to receive the bolts 16 by which the clamp elements are drawn toward each other, and also secured to the wheel disc 11.

From the foregoing, it will be seen that the rim 17 may be mounted at least in three different positions axially of the hub 10, and by reason of the reversible character of the hub on its axle, the rim may be disposed at least in six different positions with relation to the center line of the vehicle. The clamping elements rest with their inner ends upon the seats 12, 13, or 14, and because their bolts 16 extend through bolt-holes in the wheel disc, they maintain the rim 17 in concentric relation to the axis of the wheel, notwithstanding severe radial strains to which said rim may be subjected in service. The clamping elements grip the rim on opposite sides of its central well with equal pressure, and are drawn by the bolts 16 into laterally abutting relation to a lateral face of the wheel disc, with the result that there is no tendency to flex or deform the rim out of its normal plane. The invention provides for the rapid and facile mounting of the rim in different axial positions relatively of the hub, and achieves the other advantages set out in the foregoing statement of objects.

Figure 5:
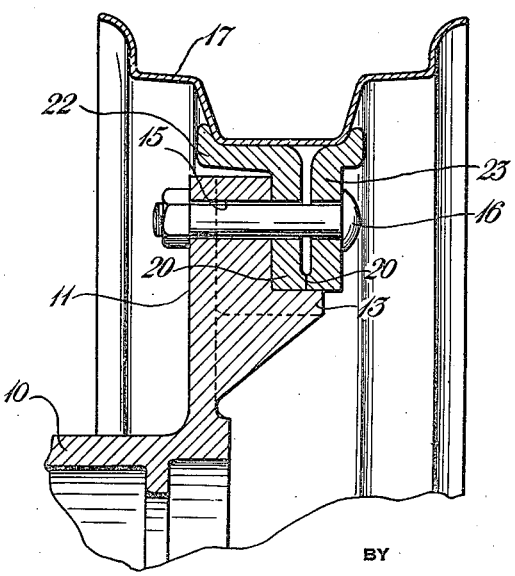
Figure 5 is a section similar to Figure 3 showing another embodiment of the clamp means that secures the rim to the wheel.

In the embodiment of the invention shown in Figure 5, the hub 10, disc 11, the clamp seats on the latter, and the rim 17 are identical with those hereinbefore described. The rim supporting clamps, however, differ from those previously described in that while the outer end portion of each clamp element is reversely curved, the offset produced by such reverse curvature is greater on one of the clamp elements than on the other. This is clearly shown in the drawing wherein the outer end portion of clamp element 22 has greater offset than clamp element 23. The clamp elements 22, 23 are drawn toward each other by the bolts 16 whereby the offset portions at the outer ends of the elements engage the inner corners of the central well of the tire rim to fixedly secure the latter to the wheel disc. Because the offset portion of clamp element 22 is greater than that of clamp element 23, the central plane of the rim 17 is disposed laterally of a plane passing between the confronting faces of the clamp elements. By reversing the positions of the clamping elements 22, 23, the central plane of the rim 17 may be disposed on the opposite side of the central plane of the clamps. Thus the clamping elements shown in Figure 5 make is possible to position the tire rim in two alternative positions axially of the wheel upon each series of clamp seats 12, 13, and 14, and this together with the reversible character of the wheel hub, provide such adjustability of the position of the rim as to enable the attainment of practically any desired tread width of the vehicle.

Other modification may be resorted to without departing from the spirit of the invention or the scope thereof as defined by the appended claims.

What is claimed is:

1. In a wheel structure the combination of a wheel disc formed on opposite lateral faces thereof with laterally extending clamp seats, two-part clamps each consisting of cooperating elements, which elements rest with their inner ends upon clamp seats on one side only of said disc, the outer ends of said clamps being engageable with a tire rim disposed concentrically with the axis of the wheel disc, and bolts extending through the respective clamp elements and through the wheel disc for securing the clamp elements to the latter and for drawing the two parts of each clamp together upon a portion of said tire rim.

2. A wheel structure comprising a wheel disc formed on a face thereof with a circumferential series of laterally projecting seats for respective rim clamps, the alternate seats of the series projecting farther from the disc than the seats intermediate thereto.

3. A wheel structure comprising a wheel disc formed on opposite faces thereof with circumferential series of laterally projecting seats for respective rim clamps, the alternate seats of the series on one face thereof projecting farther from the disc than the seats intermediate thereto, the seats on the other face of the disc being in transverse alignment with one group of said seats at least.

4. A wheel structure comprising a wheel disc, a tire rim, and rim clamps that are mountable upon the wheel disc, each of said clamps consisting of a pair of identical metal elements disposed in confronting relation and having their outer end portions reversely curved in opposite directions to provide offset portions adapted to engage the tire rim, and a local lateral projection on the inner end portion of one of said elements constituting a fulcrum for the other element.

5. A wheel structure comprising a wheel disc, a tire rim, and rim clamps that are securable to a lateral face of the wheel disc, each of said clamps consisting of a pair of metal elements disposed in confronting relation and having their respective outer end portions reversely curved in opposite direction to provide offset rim-engaging portions, the length of the offset portion of one element being greater than the length of the offset portion of the other element so that the tire rim is supported laterally of the central plane of the clamps, and means for drawing said elements toward each other to confine the tire rim between the outer ends thereof.

6. A combination as defined in claim 5 in which one of the clamp elements is fulcrumed on the other element at its inner end, and is drawn toward the other clamp element with an angular movement about the fulcrum as an axis.

7. A wheel structure comprising a wheel disc formed with a circumferential series of clamp seats on a lateral face thereof, two part rim clamp units on each clamp seat, each of said clamps consisting of a pair of cooperating elements, the inner end of each element of a clamp unit resting upon the same clamp seat, the outer ends of said clamp elements comprising reversely curved portions engageable with a tire rim, and means extending through holes in the wheel disc for drawing said clamp elements together to confine said tire rim.

8. A wheel structure comprising a wheel disc, a plurality of laterally projecting and radially extending clamp seats being formed on said wheel disc, rim clamps having a radially extending portion and being seated on said clamp seats and positively held against radially inward movement of said wheel thereby, each of said clamps comprising metal elements in confronting relation to each other, the radially outer end portions of said elements being shaped to engage a wheel rim, one of said elements in each clamp abutting the radially extending portion of each of said clamp seats for substantially the entire radial length of the clamp, the other of said elements of each clamp being totally spaced from the first clamp element except for a portion thereof fulcrumed on said first clamp element at its radially inner end, and means for hingedly drawing said second clamp element toward said first clamp element and for positively seating said clamps on said clamp seats.

WINFIELD S. BRINK.